(12) United States Patent
Ohtani

(10) Patent No.: US 6,262,813 B1
(45) Date of Patent: Jul. 17, 2001

(54) APPARATUS AND METHOD FOR IMAGE DATA PROCESSING APPARATUS CAPABLE OF CORRECTING DOTS OF BIT-MAPPED IMAGE DATA WITH A RELATIVELY SMALLER-SIZED MEMORY

(75) Inventor: Masakazu Ohtani, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/134,162

(22) Filed: Aug. 14, 1998

(30) Foreign Application Priority Data

Aug. 18, 1997 (JP) ..................................... 9-237806

(51) Int. Cl.⁷ ................................ G06K 9/00; G06K 9/40
(52) U.S. Cl. .......................... 358/1.9; 382/181; 382/266; 382/267; 382/269
(58) Field of Search ..................................... 382/181, 190, 382/195, 205, 266, 267, 269; 358/1.9

(56) References Cited

U.S. PATENT DOCUMENTS

| | | | | |
|---|---|---|---|---|
| 5,404,411 | * | 4/1995 | Banton et al. | 382/269 |
| 5,475,766 | * | 12/1995 | Tsuchiya et al. | 382/266 |
| 5,596,684 | * | 1/1997 | Ogletree et al. | 358/1.9 |
| 5,748,776 | * | 5/1998 | Yoshida | 382/195 |
| 5,915,042 | * | 6/1999 | Matsushiro | 382/181 |
| 5,946,415 | * | 8/1999 | Su et al. | 382/190 |
| 5,995,652 | * | 11/1999 | Chiu et al. | 382/181 |

\* cited by examiner

*Primary Examiner*—Thomas D. Lee
(74) *Attorney, Agent, or Firm*—Oblon, Spivak, McClelland, Maier & Neustadt, P.C.

(57) ABSTRACT

An image data processing apparatus that conserves a memory used for correcting a dot of a bit-mapped image data includes a data window, a pattern recognition mechanism, a determining mechanism, an information converter, and a memory block. The data window reads the bit-mapped image data by capturing dot patterns. The pattern recognition mechanism recognizes a figure of a line segment formed between black and white dot areas included in the captured dot pattern. The pattern recognition mechanism also generates a n-bit code that has a value corresponding to the recognized figure of the line segment. The n-bit code potentially has $2^n$ different values for representing specific figures of the line segment. The determining mechanism determines whether the dot of interest needs a correction. The information converter converts values of the n-bit code to one of two predetermined values for white and black dots of interest when the dot of interest needs no correction, and outputs the n-bit code without conversion when the dot of interest needs the correction. The memory block stores a number of correction data which are accessed with the n-bit code. The number of stored correction data includes only correction data for cases when the dot of interest needs the correction and for two cases when the dot of interest needs no correction, and is made smaller than $2^n$. Each of the correction data stored in the memory block uniquely corresponds to one of the two different values, although resultant values of the n-bit code may become discrete.

12 Claims, 13 Drawing Sheets

Fig. 8

| SIGNALS | A NUMBER OF BIT | WEIGHT |
|---|---|---|
| H/V | 1 BIT | MSB |
| DIR1, DIR0 | 2 BITS | ↑ |
| B/W | 1 BIT | |
| U/L | 1 BIT | |
| G3, G2, G1, G0 | 4 BITS | ↓ |
| P2, P1, P0 | 3 BITS | LSB |

TABLE 1

Fig. 9

| CONTENTS OF CODE INFORMATION | BEFORE CONVERSION BY CODE INFORMATION CONVERTER | AFTER CONVERSION BY CODE INFORMATION CONVERTER |
|---|---|---|
| NO-MATCH SIGNAL IS SET TO 0 (LOW). | 4096 X 1/4 = 1096<br>* WHITE DOT = 512<br>* BLAKC DOT = 512 | → 1 VALUE (700H)<br>→ 1 VALUE (600H) |
| NO-MATCH SIGNAL IS SET TO 1 (HIGH). | 4096 X 3/4 = 3072 → | 3072 VALUES |
|  | TOTAL 4096 VALUES | TOTAL 3074 VALUES |

TABLE 2

Fig. 11

| EXAMPLE OF INPUT OF CODE INFORMATION TO WEIGHT REARRANGEMENT UNIT | EXAMPLE OF OUTPUT OF CODE INFORMATION FROM WEIGHT REARRANGEMENT UNIT |
|---|---|
| 0 0 0 h ⟶ | 0 0 0 h |
| 0 0 1 h ⟶ | 0 0 1 h |
| 0 0 3 h ⟶ | 0 0 2 h |
| 6 0 0 h ⟶ | 5 2 1 h |
| 7 0 0 h ⟶ | 5 8 D h |
| D F E h ⟶ | C 0 1 h |
| D F F h ⟶ | C 0 2 h |
| DISCRETE 3074 VALUES | SERIAL 3074 VALUES |

TABLE 3

Fig. 13

| | ADDRESS CODES INPUT TO MEMORY BLOCK |
|---|---|
| A RESOLUTION IS SELECTED AND OUTPUT SIGNAL FROM MEMORY BLOCK IS 0 (LOW) | 0 0 0 0 h<br>0 0 0 1 h<br>0 0 0 2 h<br>⋮<br>0 C 0 0 h<br>0 C 0 1 h<br>0 C 0 2 h |
| ANOTHER RESOLUTION IS SELECTED AND OUTPUT SIGNAL FROM MEMORY BLOCK IS 1 (HIGH) | 1 0 0 0 h<br>1 0 0 1 h<br>1 0 0 2 h<br>⋮<br>1 C 0 0 h<br>1 C 0 1 h<br>1 C 0 2 h |

TABLE 4

APPARATUS AND METHOD FOR IMAGE DATA PROCESSING APPARATUS CAPABLE OF CORRECTING DOTS OF BIT-MAPPED IMAGE DATA WITH A RELATIVELY SMALLER-SIZED MEMORY

BACKGROUND OF THE INVENTION

1. Field of the Invention

This invention relates to an apparatus and method for an image data processing apparatus, and more particularly to an apparatus and method for an image data processing apparatus that is capable of correcting dots of bit-mapped image data with a relatively small-sized memory capacity.

2. Discussion of the Background

An image data processing apparatus has been developed which is capable of correcting jagged lines formed in bit-mapped image data to improve image quality with a minimal memory for storing correct data. One example of such a technique is disclosed in U.S. Pat. No. 5,327,260. This disclosed technique uses a CPU (central processing unit) or the like to determine which dots need a correction and what correct data is needed. More specifically, the CPU recognizes a figure of a line segment formed between black and white dot areas relative to each dot of interest included in bit-mapped image data. The CPU converts the recognized figure of the line segment into a n-bit code and determines whether the dot of interest needs a correction, using at least a part of the n-bit code. If correction is needed, the CPU performs the correction in accordance with the n-bit code.

In addition, the image data processing apparatus having the above-described dot correction technique includes a data window, a pattern recognition unit, a determining unit, and a correction data memory. The data window captures a dot of interest and surrounding dots in the bit-mapped image data. The pattern recognition unit recognizes a figure of a line segment which is formed between black and white dot areas relative to the dot of interest in the bit-mapped image data. The pattern recognition unit then generates a n-bit code that represents the figure of the recognized line segment relative to the dot of interest. The determining unit determines whether the dot of interest needs the dot correction, using at least a part of the n-bit code. The correct data memory stores a plurality of correct data which are accessed with the n-bit code used as an address code.

The above-described n-bit code includes a plurality of code information elements. One code information element indicates whether the dot of interest is either black or white. Another code information element represents a direction of gradient of the line segment. Another code information element represents a gradient of the line segment. Another code information element indicates a position of a horizontally- or vertically-continued line segment from an edged dot.

The above-configured image data processing apparatus can determine whether a dot of interest under examination needs a correction and performs the correction to the dot according to the generated n-bit code. The apparatus obviates the necessity to store all the potential patterns of a figure of line segment.

When the n-bit code is a 12-bit code, for example, a maximum of 4096 different figures of a line segment can be expressed. However, an actual number of dots which need the correction may be less than the maximum number.

SUMMARY OF THE INVENTION

Accordingly, an object of the present invention is to provide a novel image data processing apparatus which is capable of performing a dot correction operation with a reduced memory for storing correction data.

One example of an image data processing apparatus according to the present invention includes a data window, a pattern recognition mechanism, a determining mechanism, an information converter, and a memory block. The data window reads bit-mapped image data by capturing dot patterns. The pattern recognition mechanism recognizes a figure of a line segment formed between black and white dot areas included in the captured dot pattern. The pattern recognition mechanism also generates a n-bit code that has a value corresponding to the recognized figure of the line segment. The n-bit code potentially has $2^n$ different values for representing specific figures of the line segment. The determining mechanism determines whether the dot of interest needs a correction. The information converter converts values of the n-bit code to one of two predetermined values for white and black dots of interest when the dot of interest does not need a correction, and outputs the n-bit code as-is when the dot of interest needs the correction. The memory block stores a number of correction data which are accessed with the n-bit code. The number of stored correction data includes only numbers for the cases when the dot of interest needs the correction and for two cases when the dot of interest does not need a correction and is made smaller than $2^n$. Each of the correction data stored in the memory block uniquely corresponds to one of the $2^n$ different values, although resultant values of the n-bit code become discrete.

The image data processing apparatus may also include a weight rearrangement unit. If the weight rearrangement unit is included, a plurality of the n-bit codes having the discrete values can be converted into values having serial-ordered values and the converted n-bit codes can be output to the memory block.

The image data processing apparatus may also include a memory select unit. If the memory select unit is included, a memory area to be used can be selected from among a plurality of memory areas included in the memory block.

Also, each of the plurality of memory areas can store the plurality of correction data which are set to an image resolution different from other memory areas. Thereby, the resolution can be selected by the memory select unit.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8 is a table showing an example of generated code information;

FIG. 9 is a table of code information conversion performed by a code information converter of the dot correction unit of FIG. 4;

FIG. 11 is a table of code information conversion performed by a weight rearrangement unit of the dot correction unit of FIG. 4;

FIG. 13 is a table of address inputs using a resolution setting unit of the dot correction unit of FIG. 4.

DESCRIPTION OF THE PREFERRED EMBODIMENTS

In describing preferred embodiments of the present invention illustrated in the figures, specific terminology is employed for the sake of clarity. However, the present invention is not intended to be limited to the specific terminology so selected and it is to be understood that each specific element includes all technical equivalents which operate in a similar manner.

Figure 1:
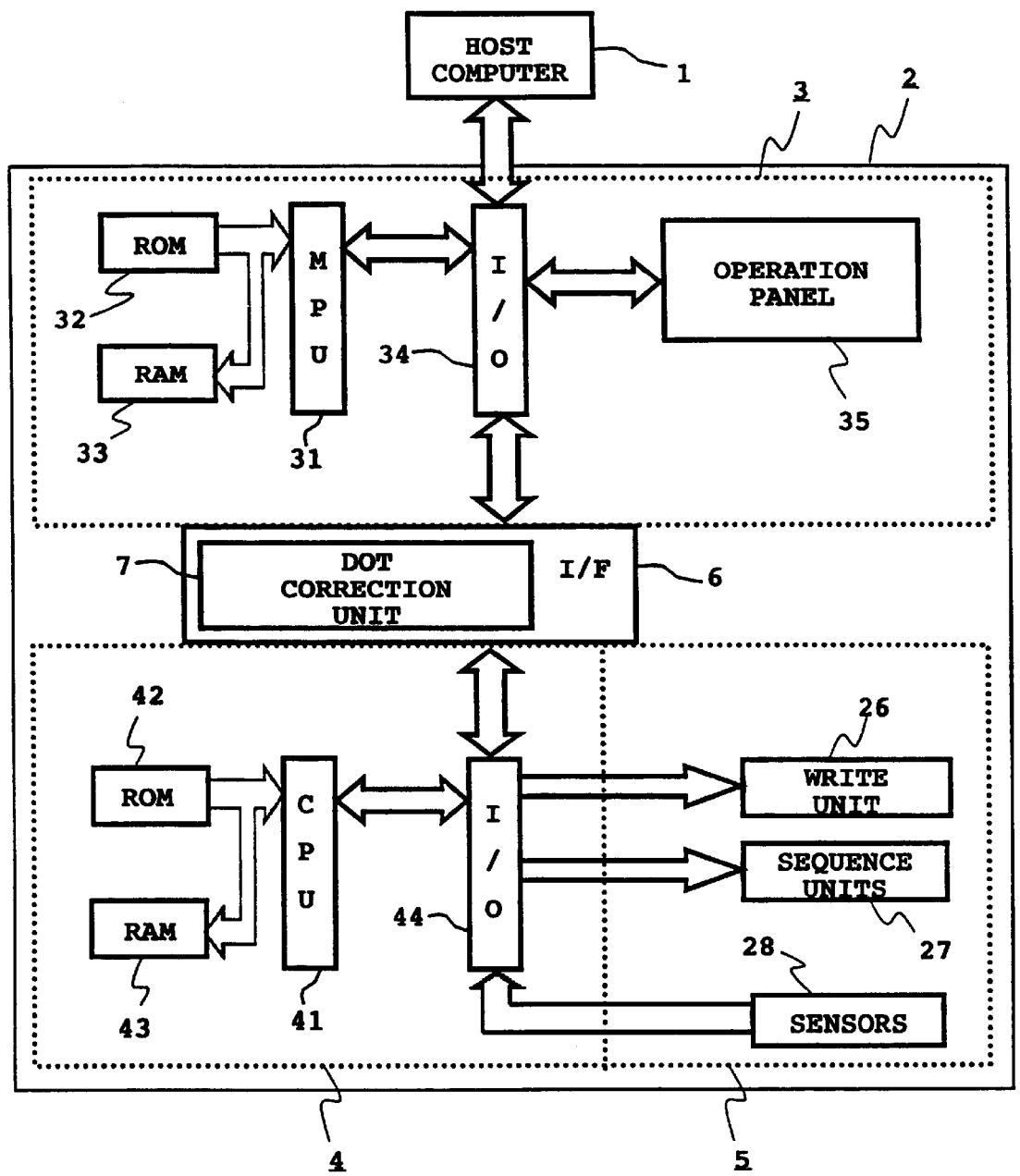
FIG. 1 is a block diagram of a laser printer, connected to a host computer, according to the present invention.

Referring now to the figures, wherein like reference numerals designate identical or corresponding parts throughout the several views, and more particularly to FIG. 1 thereof, a laser printer 2 is illustrated as an exemplary embodiment according to the present invention. The laser printer 2 of FIG. 1 includes a controller 3, an engine driver 4, a print engine 5, and an internal interface circuit 6.

In the laser printer 2, the controller 3 receives print data from a host computer 1 and converts the print data format into a bit map format in a unit of pages. The controller 3 then converts the bit map data into video data which is composed of a plurality of dots for driving a laser. The video data is transferred to the engine driver 4 via the internal interface circuit 6. At the same time, a sequential control is executed with respect to the print engine 5 in synchronism with the video data that drives the laser so as to form an image with the laser.

The controller 3 includes a MPU (microprocessing unit) 31, a ROM (read only memory) 32, a RAM (random access memory) 33, an I/O (input and output) controller 34, and an operation panel 35. The ROM 32 stores various data including a program used by the MPU 31, constant data, character font data, and so forth. The RAM 33 temporarily stores various kinds of data for processing, such as image data, dot pattern data, and so forth. The I/O controller 34 controls the input and output of data. The operation panel 35 is connected to the MPU 31 through the I/O controller 34. These units of the controller 3 are connected with each other with data, address, and control buses.

Also, a host computer 1 and the internal interface 6 that includes a dot correction unit 7 are also connected to the MPU 31 through the I/O controller 34.

The engine driver 4 includes another microprocessing unit which is referred to as a CPU (central processing unit) 41. The engine driver 4 further includes a ROM (read only memory) 42, a RAM (random access memory) 43, and an I/O (input and output) controller 44. The ROM 42 stores various data including a program used by the CPU 41, constant data, and so forth. The RAM 43 temporarily stores various kinds of data for processing. The I/O controller 44 controls the input and output of data. These units of the engine driver 4 are connected with each other with data, address, and control buses.

The I/O controller 44 is connected to the internal interface 6 and controls the input and output of data from and to the controller 3 via the internal interface 6. Input data from the controller 3 includes video data and a plurality of status signals of various switches which are disposed on the operation panel 35. Output data to the controller 3 includes an image clock signal, referred to as a WCLK (write clock) signal, and various status signals (e.g. a paper end signal). The I/O controller 44 is also connected to various units of the print engine 5, including a write unit 26, a plurality of sequence units 27, and a plurality of sensors 28, as illustrated in FIG. 1. The sensors 28 include a synchronous sensor 62 (FIG. 3), explained below.

The controller 3 receives various kinds of data, including various commands (e.g. a print command) and print data composed of character data and image data, from the host computer 1. The controller 3 then processes the data. When the received data is character data, the controller 3 converts the data, in accordance with the character fonts stored in the ROM 32, into data of a dot pattern required to write an image and that has the bit map format. Subsequently, the controller 3 stores the bit map data into a predetermined area of the RAM 33 in a unit of a page. Such a predetermined area of the RAM 33 is referred to as a video RAM (random access memory) region.

The engine driver 4 is configured to send a ready signal and the WCLK signal to the controller 3. Upon receiving the ready and WCLK signals, the controller 3 starts to transfer the bit map data stored in the video RAM region of the RAM 33 to the engine driver 4 via the internal interface 6. At this time, the bit map data that forms dot patterns is transferred as video data in synchronism with the WCLK signal, and this data undergoes a dot correction operation through the dot correction unit 7 provided in the internal interface 6.

The operation panel 35 in controller 3 is provided with various switches (not shown) and indicators (not shown). The operation panel 35 controls data in responding to instructions by an operator, informs the instructions to the engine driver 4, and indicates statuses of the laser printer 2 with the indicators thereof.

Figure 2:
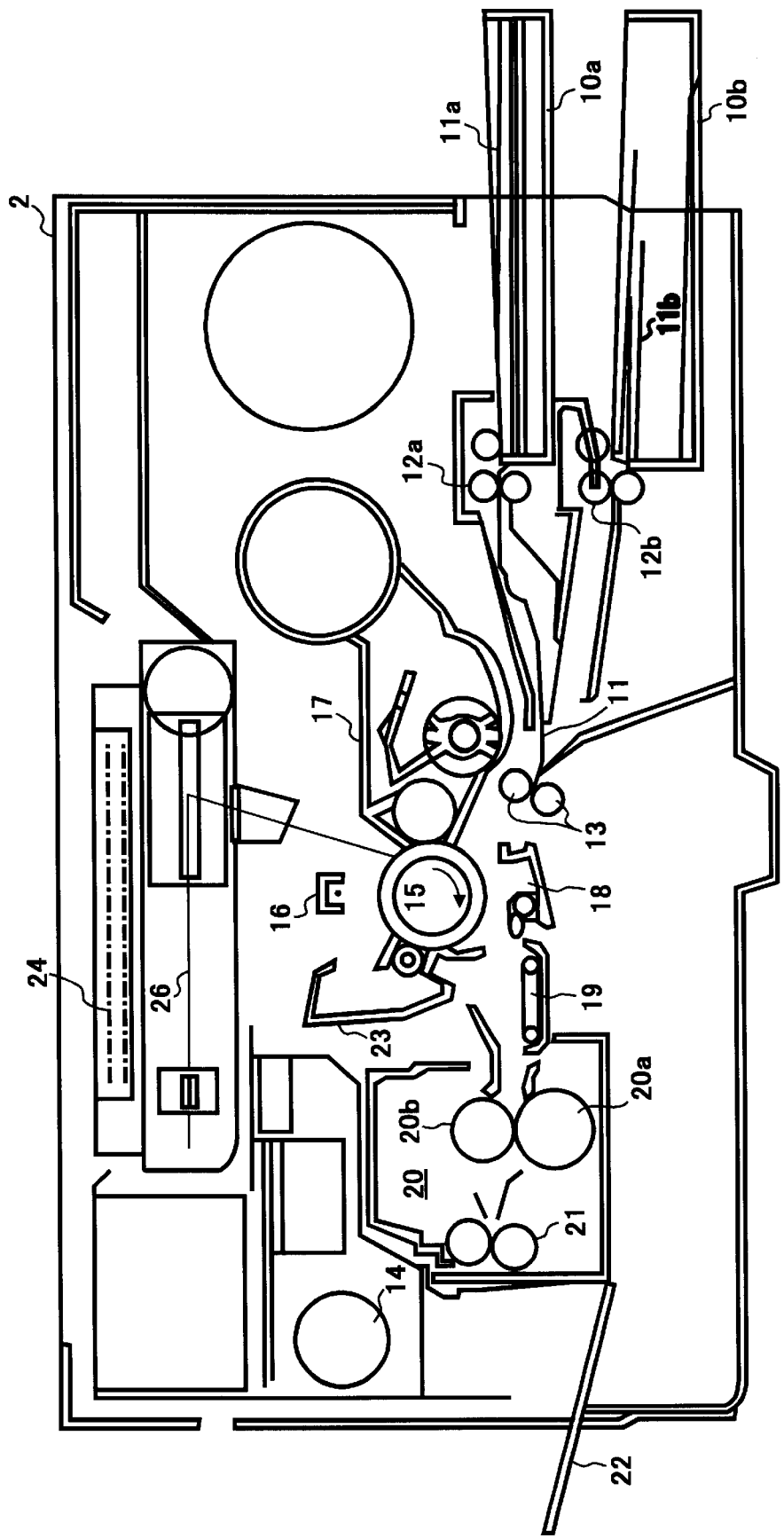
FIG. 2 is a cross sectional view of the laser printer of FIG. 1.

The engine driver 4 receives video data that has undergone dot correction to control various units of the print engine 5, for example, the write unit 26 and the sequence units 27. The sequence units 27 include, as shown in FIG. 2, a drum charger 16 and a development unit 17 which are explained below. The engine driver 4 also receives the video data for writing an image and outputs the video data to the write unit 26. At the same time, the engine driver 4 receives and processes various status signals, representing statuses of various portions of the print engine, from the various sensors 28 including the synchronous sensor 62 (FIG. 3), explained below. Also, the engine driver 4 outputs various kinds of information including error statuses (e.g. a paper end) to the controller 3 via the internal interface 6.

Next, a structure of the print engine 5 of the laser printer 2 is explained with reference to FIG. 2. In the laser printer of FIG. 2, a recording sheet is picked up with a feed roller 12a from a paper stack 11a of an upper cassette 10a or with a feed roller 12b from a paper stack 11b of a lower paper cassette 10b. For example, when a recording sheet 11 is picked up from the paper stack 11a of the upper cassette 10a, the sheet 11 is forwarded to a registration roller 13 by the feed roller 12a. Rotation of the registration roller 13 is timed to rotation of a photoconductive drum 15, and registration roller 13 advances the sheet 11 to a position at which the sheet 11 receives an image from the photoconductive drum 15.

The photoconductive drum 15 is driven by a main motor 14 to rotate in the direction indicated by an arrow. The photoconductive drum 15 has a surface that is charged by the drum charger 16, and the charged surface is scanned with a spot beam sent from the write unit 26 so that an electrostatic latent image is formed on the charged surface of the photoconductive drum 15. The spot beam from the write unit 26 is modulated through a pulse width modulation (PWM).

The electrostatic latent image formed on the photoconductive drum 15 is developed with toner by the development unit 17 and, as a result, a visual toner image is formed on the photoconductive drum 15. Then, the toner image is transferred with an operation of a transfer charger 18 onto the recording sheet 11 which is fed by the registration roller 13. When the recording sheet 11 having the toner image formed thereon is further advanced, the recording sheet 11 is separated from the photoconductive drum 15. Then, the recording sheet 11 is fed to a fixing unit 20 by a feed belt 19. Accordingly, the toner image is fixed on the recording sheet 11 with heat and pressure through the fixing unit 20 that includes a pressure roller 20a and a fixing roller 20b.

After the fixing unit 20, the recording sheet 11 is ejected by an eject roller 21 to an eject tray 22 disposed to a rear side of the laser printer 2.

After the toner image transfer, the photoconductive drum 15 is subjected to a cleaning operation by a cleaning unit 23 to remove any remaining toner. The cleaning unit 23 is disposed at a position in contact with the photoconductive drum 15 so as to scrape the remaining toner off the photoconductive drum 15. The scraped toner is collected in a waste bottle (not shown).

In addition, a plurality of print circuits boards 24, which include the controller 3, the engine driver 4, and the internal interface 6, are provided at an upper inside portion of the laser printer 2.

Figure 3:
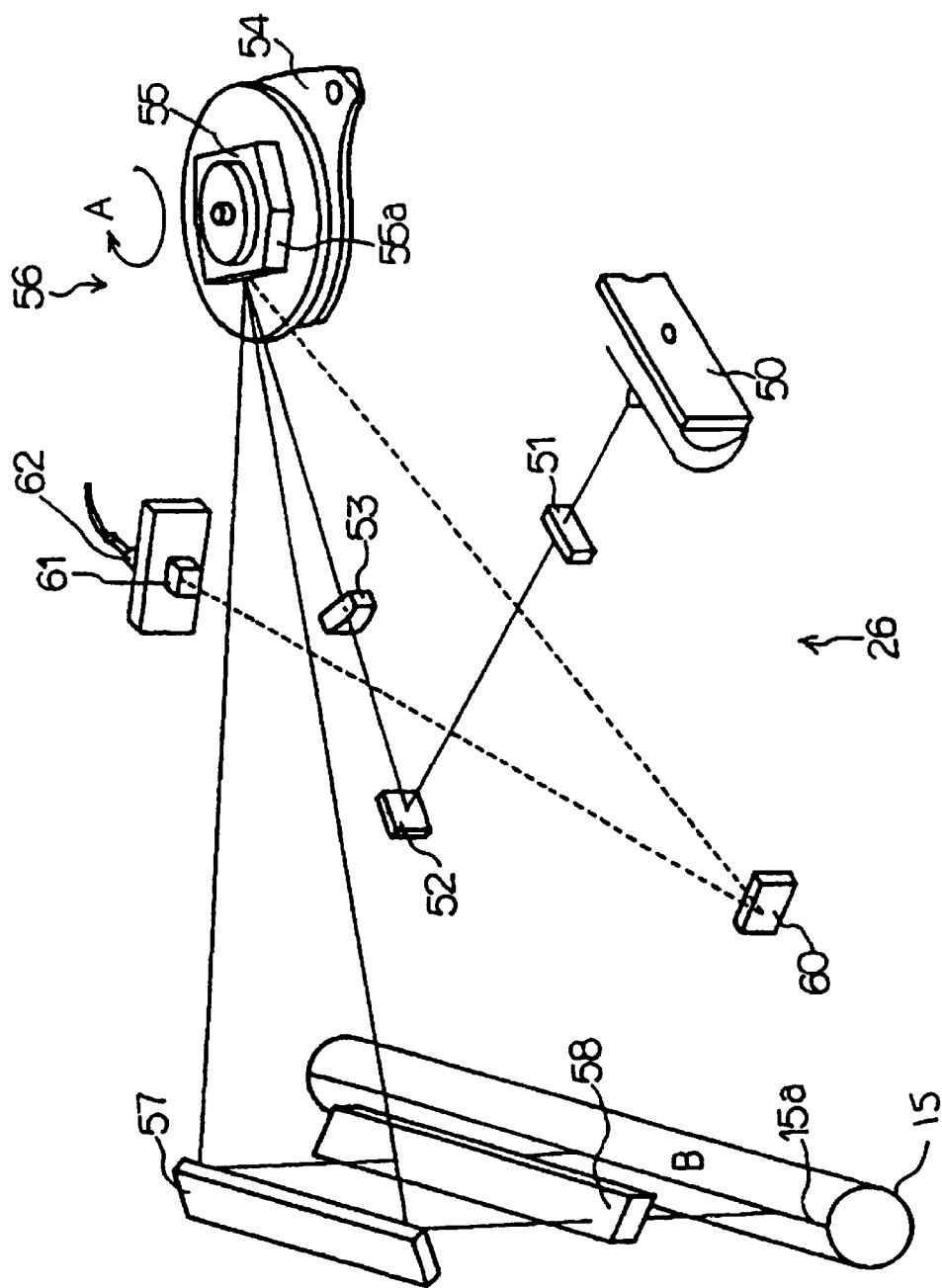
FIG. 3 is an illustration explaining a structure of a write unit of the laser printer of FIG. 1.

Next, an operation of the write unit 26 is explained with reference to FIG. 3. The write unit 26 of FIG. 3 includes a LD (laser diode) unit 50, a first cylinder lens 51, a first mirror 52, and a focus lens 53. The write unit 26 also includes a rotary reflector 56 that includes a disk motor 54 and a polygon mirror 55 rotated in the direction A with the disk motor 54. The write unit 26 further includes a second mirror 57, a second cylinder lens 58, a third mirror 60, light-gathering lens 61 composed of a cylinder lens, and the synchronous sensor 62 composed of a photorecepter.

The LD unit 50 integrates a laser diode (LD) and a collimator lens into one unit. The collimator lens of the LD unit 50 changes a diverging laser beam emitted from the LD to a non-diverging laser beam. The first cylinder lens 51 reforms the laser beam to have a desired shape thereof in a sub-scanning direction (the transverse axis direction of the photoconductive drum 15) on the drum 15. The focus lens 53 changes the non-diverging laser beam reflected by the first mirror 52 to a converging laser beam that falls on a mirror surface 55a of the polygon mirror 55.

The polygon mirror 55 receives the laser beam that has been converged and is therefore referred to as a post-object type rotary polarizer. The polygon mirror 55 has a plurality of curved mirrors to eliminate a use of a fØ lens which is required by background type polygon mirrors to be disposed between the second mirror 57 and the polygon mirror. The second mirror 57 changes the direction of the polarized beam (scanning beam) reflected by the rotary polarizer 56 so that the beam runs towards the photoconductive drum 15. The scanning beam via the second mirror 57 passes through the second cylinder lens 58 and impinges on the photosensitive drum 15 to make a sharp spot on a main scanning line 15a on the photosensitive drum 15.

The third mirror 60 is disposed out of an area in which the beam for scanning the drum 15 passes, and third mirror 60 reflects the incoming laser beam to the light-gathering lens 61 and the synchronous sensor 62. The light-gathering lens 61 gathers the incoming laser beam, and the synchronous sensor 62 composed of a photorecepter (e.g. a photodiode) converts the incoming laser beam into a synchronous signal for maintaining an initial position of a main scanning operation by the laser beam.

Figure 4:
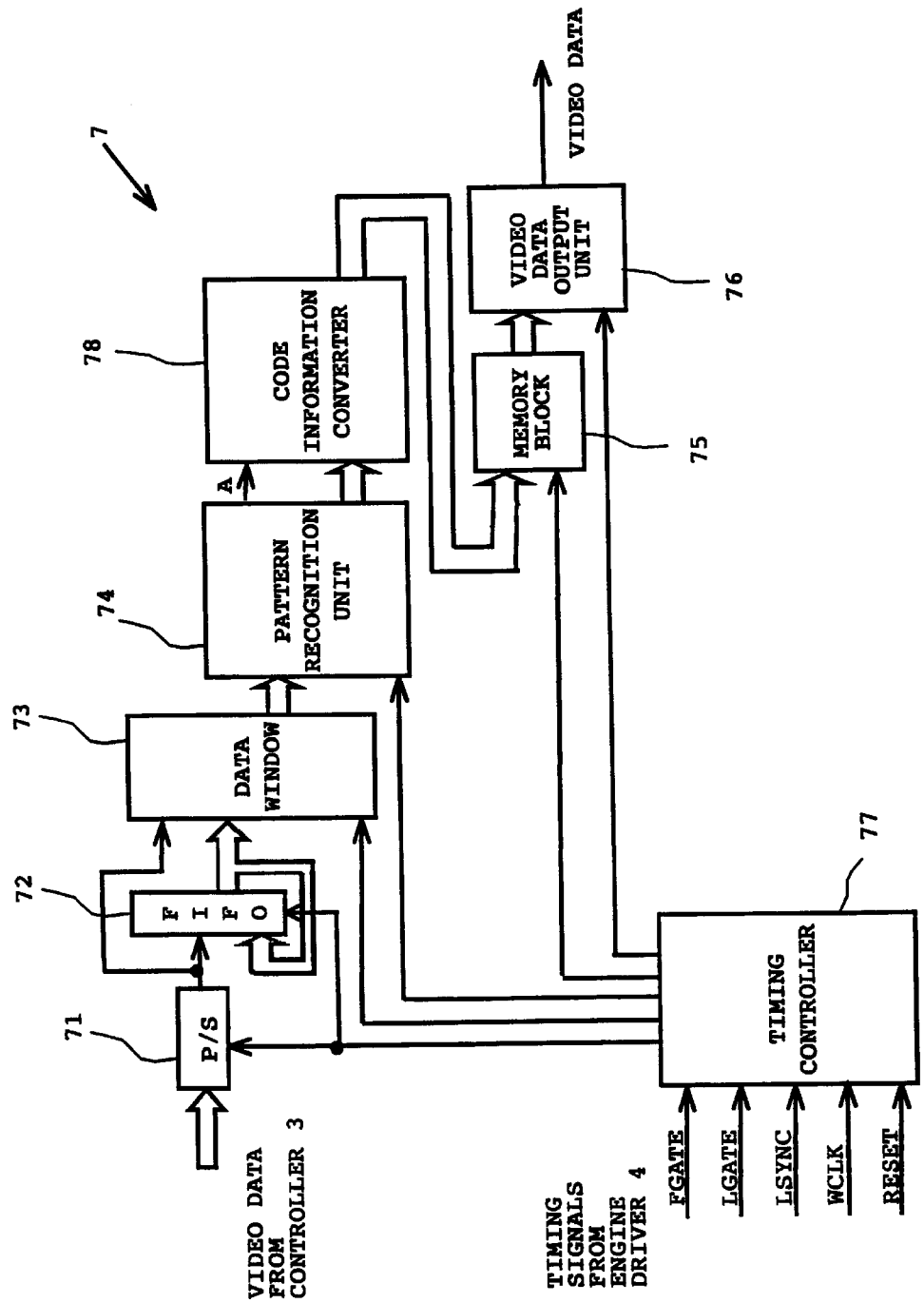
FIG. 4 is a block diagram of a dot correction unit of the laser printer of FIG. 1.
Figure 5:
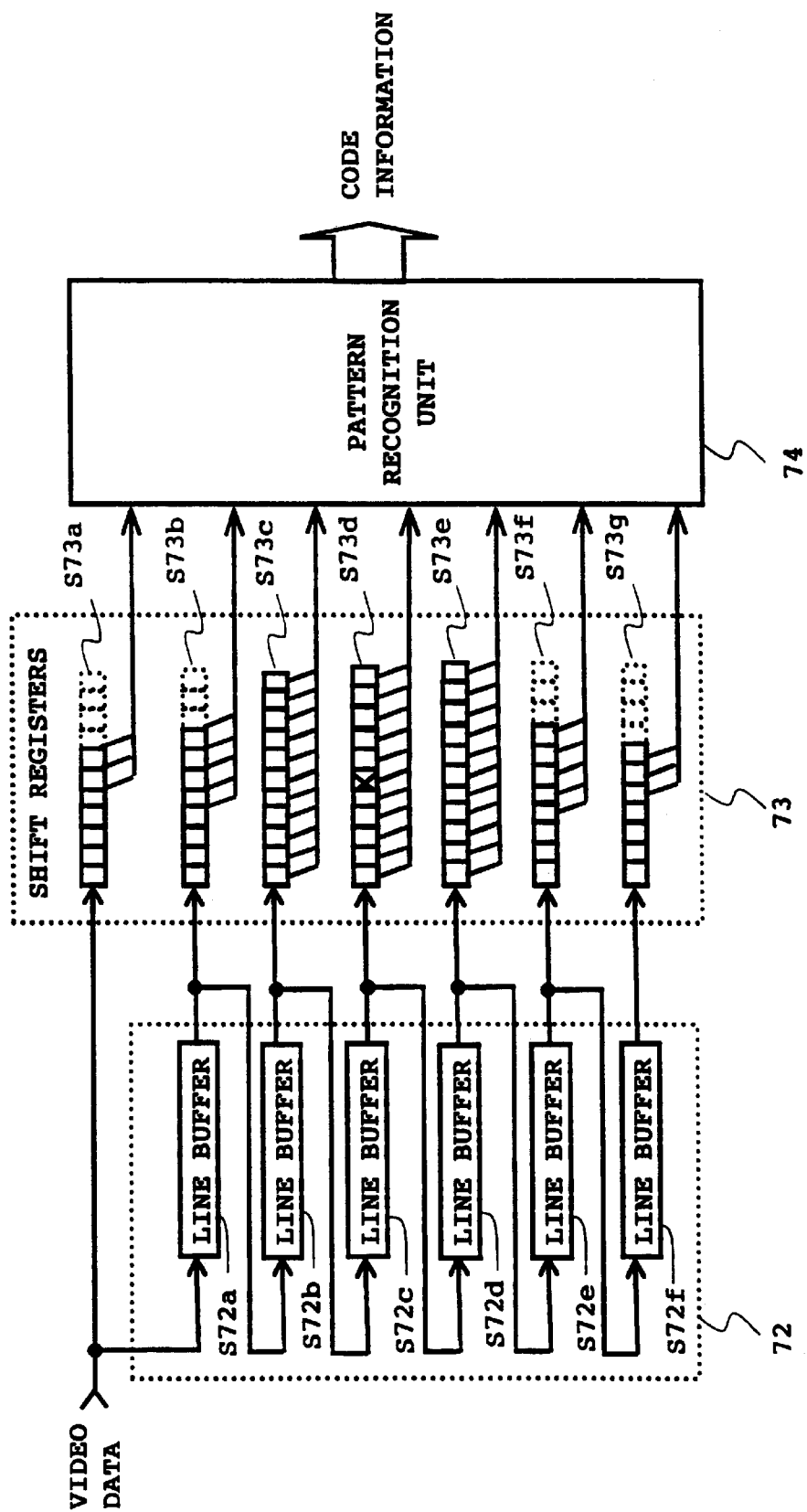
FIG. 5 is a block diagram explaining details of a FIFO memory and a window of the dot correction unit of FIG. 4.
Figure 6:
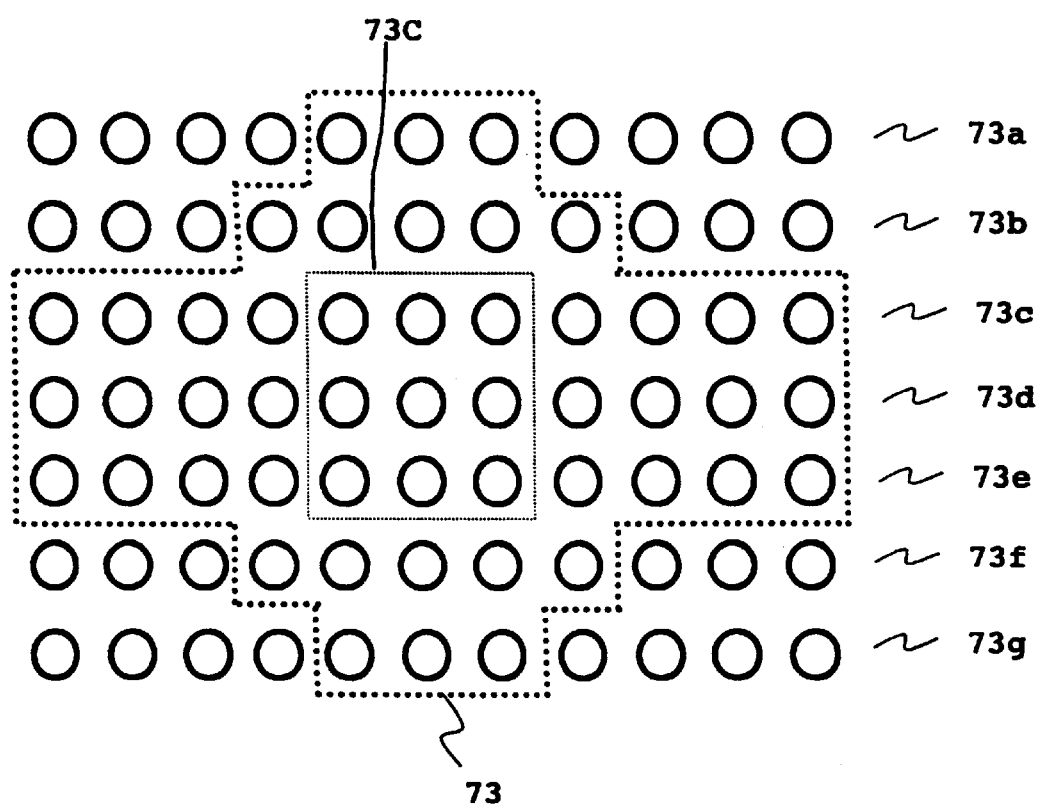
FIG. 6 is an illustration explaining an 11-by-7-bit matrix and an exemplary window achieved by the window of the dot correction unit of FIG. 4.

Next, a description of the dot correction unit 7 will be provided with reference to FIGS. 4–6. As illustrated in FIG. 4, the dot correction unit 7 includes a parallel-to-serial (P/S) converter 71, a FIFO (first-in and first-out) memory 72, and a data window 73. The dot correction unit 7 also includes a pattern recognition unit 74, a code information converter 78, a memory block 75, a video data output unit 76, and a timing controller 77. The timing controller 77 maintains signal synchronization in the dot correction unit 7.

The P/S converter 71 converts parallel video data (e.g. eight bit) signals into a serial video data (one bit) signal. Accordingly, the P/S converter 71 is needed only when the controller 3 outputs the parallel video data, and is not needed when the controller 3 outputs the serial video data. After the P/S converter 71, the serial video data is input to the FIFO memory 72. As illustrated in FIG. 5, the FIFO memory 72 includes, for example, six serial-connected line buffers S72a–S72f for storing such an amount of video data for the length of six main scanning lines.

The data window 73 includes seven 11-bit shift registers 73a–73g, as illustrated in FIG. 5, corresponding to an amount of video data for the length of seven main scanning lines; six lines from the FIFO memory 72 and one line from the P/S converter 71. The thus-configured data window 73 can capture dot patterns. An exemplary relationship between the dot matrix and the data window 73 is illustrated in FIG. 6.

In the data window 73, the last four bits of the shift registers 73a and 73g and the last three bits of the shift registers 73c and 73f are actually not in use. This is illustrated in FIG. 5 by the dotted lines. A cross mark placed at the center bit of the shift register 73d of FIG. 5 indicates the bit that stores a dot of interest. As the video data stored in the FIFO memory 72 and the data window 73 is shifted bit by bit, the dot of interest is correspondingly changed one to another. Accordingly, the video data of the data window 73 can be sequentially captured in the form of dot patterns, each of which has a dot of interest at the center thereof.

The pattern recognition unit 74 receives the captured dot patterns from the data window 73. In the pattern recognition unit 74, each dot pattern is analyzed from various points in order to recognize the distinction thereof. For example, the pattern recognition unit 74 checks information relative to the targeted dot of interest and dots surrounding the dot of interest. The pattern recognition unit 74 also checks information relative to a shape of a line segment formed between white dots and black dots of image data. The pattern recognition unit 74 outputs information of the recognition result in codes according to a predetermined format. The code information from the pattern recognition unit 74 is input to the code information converter 78. If the code information is not converted through the code information converter 78, the information is used as an address code for the memory block 75, explained below.

Figure 7:
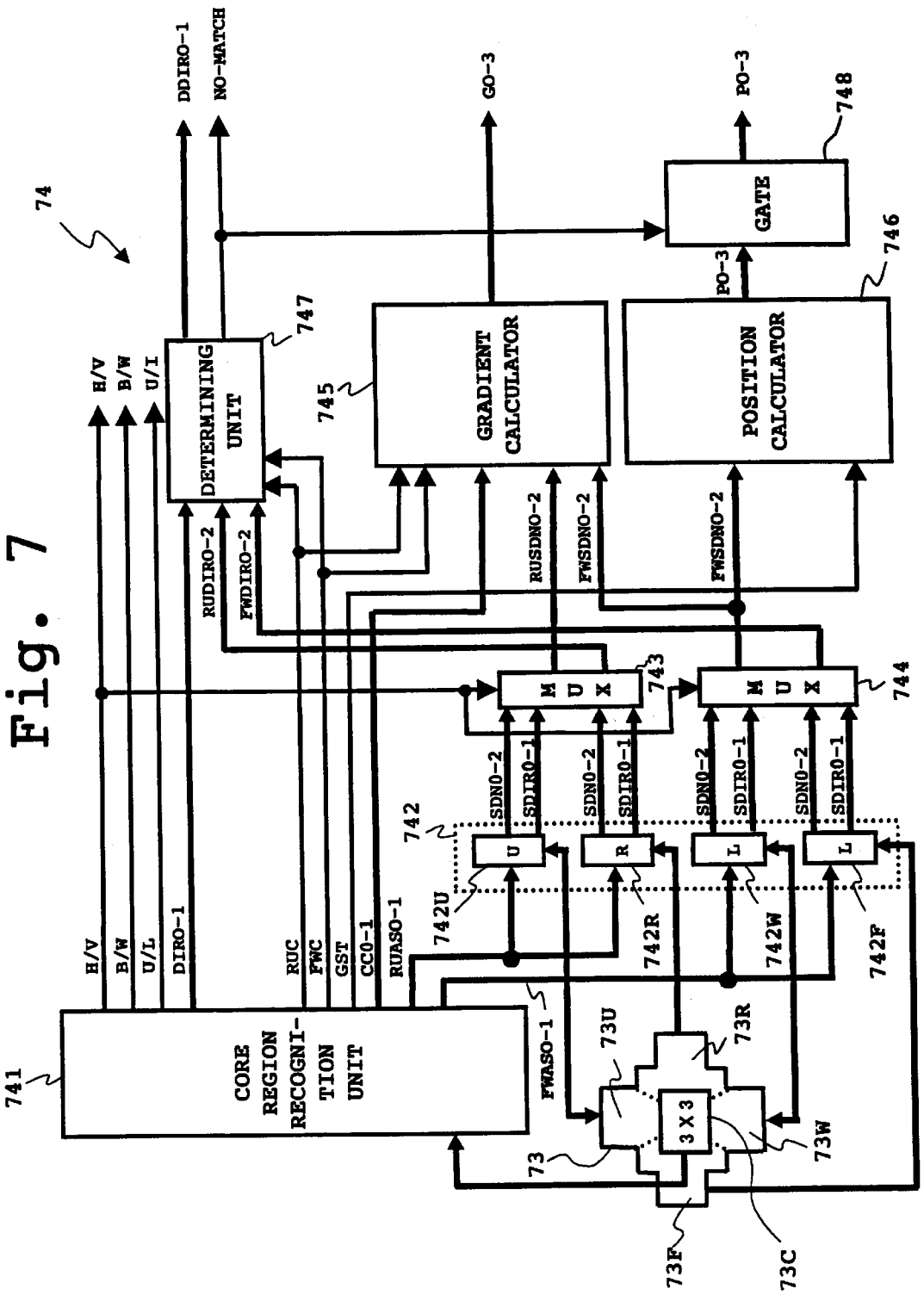
FIG. 7 is a block diagram explaining details of a pattern recognition unit of the dot correction unit of FIG. 4.

Before describing the code information converter 78, the memory block 75, and the video data output unit 76, a correlation of the data window 73 and the pattern recognition unit 74 will now be explained with reference to FIG. 7. FIG. 7 illustrates a configuration of the pattern recognition unit 74, showing relations with the data window 73. For further details, Japanese Laid Open Application JPAP05-207282 (1993) which discloses the structure and operations of these units 73 and 74 is incorporated herein by reference.

As illustrated in FIG. 7, a window for sampling a dot pattern with the data window 73 has five sections including a center 3-bit-by-3-bit core region (CORE) 73C, an upper region (UPPER) 73U, a lower region (LOWER) 73W, a left region (LEFT) 73F, and a right region (RIGHT) 73R. The pattern recognition unit 74 includes a core region recognition unit 741, a peripheral region recognition unit 742, and multiplexers (MUX) 743 and 744. The pattern recognition unit 74 also includes a gradient calculator 745, a position calculator 746, a determining unit 747, and a gate 748. The peripheral region recognition unit 742 includes an upper unit (U) 742U, a right unit (R) 742R, a lower unit (W) 742W, and a left unit (F) 742F.

The core region recognition unit 741 captures data of each dot included in the CORE 73C of the data window 73. The core region recognition unit 741 executes various determination operations and calculations with respect to the dot of interest included in the core 73C and outputs H/V (horizontal and vertical), B/W (black and white), and U/L (upper and lower) signals to the code information converter 78. At the same time, the core region recognition unit 741 switches input signals to the multiplexers 743 and 744 according to the H/V signal. The H/V signal indicates if a line segment is nearly a horizontal line or a vertical line, the B/W signal indicates if the dot of interest (pixel) is black or white, and the U/L signal indicates if the dot of interest is positioned above or below the line segment when the dot of interest is white.

The core region recognition unit 741 outputs RUC (right, upper, center) and FWC (left, lower, center) signals for indicating which peripheral region is needed to be determined to the gradient calculator 745 and the determining unit 747. The core region recognition unit 741 also outputs to the position calculator 746 a GST (groove start) signal for indicating whether the dot of interest is positioned at a start of a groove. The core region recognition unit 741 also outputs to the determining unit 747 DIR0 and DIR1 (direction) signals for representing code information indicating a gradient direction of the line segment.

Further, the core region recognition unit 741 outputs to the gradient calculator 745 CC0 and CC1 (core, center) signals for indicating a number of successive dots within the core 73C. The core region recognition unit 741 outputs RUAS0 and RUAS1 (right, upper, area, sub) signals for designating one of three sub-areas included in the UPPER region 73U and one of three sub-areas included in the RIGHT region 73R to the upper and right region recognition units 742U and 742R. The core region recognition unit 741 outputs FWAS0 and FWAS1 (left, lower, area, sub) signals for designating one of three sub-areas included in the Lower region 73W and one of three sub-areas included in the LEFT region 73F to the lower and left region recognition units 742W and 742F.

In the peripheral region recognition unit 742, the above-mentioned peripheral region recognition unit 742U captures the data of each dot included in the designated sub-area of the corresponding UPPER region 73U and recognizes a pattern of line segment based on the captured dot data. The peripheral region recognition unit 742U then outputs to the multiplexers 743 and 744 SDN0, SDN1, and SDN2 (successive dot number) signals for indicating a number of successive dots in the sub-area and SDIR1 and SDIR1 (sub, direction) signals for indicating a gradient direction of the line segment. At the same time, the units 742R, 742W, and 742F also perform dot data capturing and data output operations in a similar manner as the peripheral region recognition unit 742U performs, with respect to the corresponding regions RIGHT 73R, LOWER 73W, and LEFT 73F, respectively.

The multiplexer 743 receives the input from the upper region recognition unit 742U when the H/V signal is 0 (low) and receives the input from the right region recognition unit 742R when the H/V signal is 1 (high). The multiplexer 743 then outputs RUSDN0, RUSDN1, and RUSDN2 (right, upper, successive dot number) signals for indicating a number of successive dots within the sub-area to the gradient calculator 745 and RUDIR0 and RUDIR1 (right, upper, direction) signals for indicating a gradient direction of the line segment to the determining unit 747.

The multiplexer 744 receives the input from the lower region recognition unit 742W when the H/V signal is 0 (low) and receives the input from the left region recognition unit 742F when the H/V signal is 1 (high). The multiplexer 744 then outputs FWSDN0, FWSDN1, and FWSDN2 (left, lower, successive dot number) signals for indicating a number of successive dots within the sub-area to the gradient calculator 745 and the position calculator 746, and also outputs FWDIR0 and FWDIR1 (left, lower, direction) signals for indicating a gradient direction of the line segment to the determining unit 747.

The determining unit 747 determines if the line segment under process needs the dot correction operation, on the basis of the received code information and signals DIR0 and DIR1, RUDIR0 and RUDIR1, FEDIR0 and FWDIR1, RUC, and FWC. If the determination is made that the line segment needs the dot correction operation, the determining unit 747 outputs DDIR0 and DDIR1 (determine, direction) signals for indicating a gradient direction of the line segment and a NO-MATCH signal which is set to 1 (high). The NO-MATCH signal is applied to the gate 748 as a chip select signal, as illustrated by the arrow A in FIG. 4. When the NO-MATCH signal is 1 (high), the gate 748 is selected and gate 748 outputs P0–P3 (position) signals for indicating position information. When the NO-MATCH signal is 0 (low), the gate 748 is not selected and inhibits the P0, P1, P2, and P3 (position) signals.

The gradient calculator 745 calculates a gradient of the line segment under process, on the basis of the received code information, each indicating the successive dots, and signals CC0 and CC1, RUSDN0–RUSDN2, FWSDN0–FWSDN2, RUC, and FWC. The calculated gradient is expressed by a number of successive dots. The gradient calculator 745 then outputs code information G0, G1, G2, and G3 (gradient) for indicating a gradient of the line segment under process.

The position calculator 746 calculates a position of the dots of interest under processing, on the basis of the received code information and signals FWSDN0–FWSDN2, and GST. The position calculator 746 then outputs code information P0, P1, P2, and P3 (position) for indicating a position of the dots of interest.

FIG. 8 illustrates an example of 12-bit-weighted code information generated by the pattern recognition unit 74. Although in this example one bit is eliminated from G0, G1, G2, and G3 (4 bits) in order to make the code information 12-bit data, the bit elimination may alternatively be applied to P0, P1, P2, and P3 (4 bits). The 12-bit-weighted code information includes, from the MSB (most significant bit) to the LSB (least significant bit), H/V, DIR1, DIR0, B/W, U/L, G3, G2, G1, G0, P2, P1, and P0, as illustrated in Table 1 of FIG. 8.

In the example being explained, the code information converter 78 is provided between the pattern recognition unit 74 and the memory block 75. The code information converter 78 is configured to receive the code information (12 bits) and the NO-MATCH signal from the pattern recognition unit 74. As described above, the code information represents the distinction of the recognized line segment relative to the dot of interest and the NO-MATCH signal indicates whether the line-shaped segment formed between the black dot area and the white dot area needs to be corrected through the dot correction operation. If the NO-MATCH signal indicates that the dot correction operation is needed, the code information converter 78 transfers the code information to the memory block 75.

If the NO-MATCH signal indicates that the dot correction operation is not needed, the code information converter 78 converts the received code information into such code information that indicates that no dot correction operation is needed. In this conversion, the code information indicating no need of the dot correction operation includes two cases. One case is that the dot of interest is a white dot and the other case is that the dot of interest is a black dot. Accordingly, the conversion can be executed using the information, B/W, indicating whether the dot of interest is a white dot or is a black dot. Then, the code information converter 78 transfers the converted code information to the memory block 75.

The memory block 75 previously stores 10-bit dot correction data which includes a plurality of corrected dot patterns. Each of the corrected dot patterns is associated with at least one dot pattern from among possible dot patterns. When the code information (12-bit) is sent without conversion from the code information converter 78, the memory block 75 receives the code information as addressing codes and outputs the corresponding 10-bit correction data. When the code information is converted by the code information converter 78 and is then sent to the memory block 75, the memory block 75 receives the converted code information as addressing codes and outputs the corresponding correction data. The output data from the memory block 75 is video data for driving the laser diode of the LD unit 50 to write a corrected dot pattern.

Next, the code conversion by the code information converter 78 is explained with reference to FIG. 9. In this example being explained, the pattern recognition unit 74 is 25 configured to output 12-bit code information which generates 4096 codes each representing a different distinction of the recognized line segment relative to a dot of interest. In this example, the determining unit 747 is configured to perform the determination at such a level that one fourth of the 4096 patterns needs no performance of the dot correction operation. The determining unit 747 can indicate one fourth of the 4096 patterns by setting the DDIR0 and DDIR1 signals to 1 (one), for example, as illustrated in Table 2 of FIG. 9. As a result, 1042 patterns can be represented simply by two kinds of code information, one in which a dot of interest is a white dot and the other in which a dot of interest is a black dot. In the example being explained, the dot patterns in no need of the dot correction operation and having a white interest dot are represented by a code, 600H, for example. Also, the dot patterns in no need of the dot correction operation and having a black interest dot are represented by a code, 700H, for example. Accordingly, the memory block 75 can save the memory capacity for 1042 corrected dot patterns.

Corrected data output from the memory block 75 is in the form of parallel signals and corresponds to every dot of the video data sent from the controller 3. More specifically, the corrected data for one dot represents a value A. A laser emitting time period for forming the dot is divided by a plural number B, and a resultant time period has a value C. The value A is obtained by multiplying the value C by a whole number, wherein the whole number is equal to or smaller than the value B.

The video data output unit 76 receives the parallel data from the memory block 75 and converts the data into serial video data to send to the print engine 5 via the engine driver 4. The serial video data is then input to the write unit 26 of the print engine 5 and drives the laser diode of the LD unit 50 so as to generate a laser scanning beam.

The timing controller 77 receives timing signals from the engine driver 4, including the signals FGATE (frame gate), LGATE (line gate), LSYNC (line synchronous), WCLK (write clock), and RESET (reset). The FGATE signal defines a time period for writing data for one page. The LGATE signal defines a time period for writing data for one line. The LSYNC signal indicates timings of a start and end of each line. The WCLK signal defines cycles for reading and writing each dot. On the basis of these timing signals, the timing controller 77 outputs various clock signals to synchronize the operations of the above-described units included in the dot correction unit 7 of FIG. 4.

In addition, the above-described serial-to-parallel data conversion by the video data output unit 76 is needed only when the laser diode of the LD unit 50 is controllable by the binary data, as applied in the example being explained. The conversion is not needed when a multilevel laser control is applied, and the parallel output data may be applied to a LD unit for the multilevel laser control.

Furthermore, a part or the whole of the data set for the corrected dot patterns stored in the memory block 75 may be changed by selectively downloading one stored corrected dot pattern from the ROM 32 or the ROM 42, or from the host computer 1.

As described above, the laser printer 2 can efficiently increase image quality by performing the dot correction operation with a largely-saved capacity of the memory used for the dot correction operation.

Figure 10:
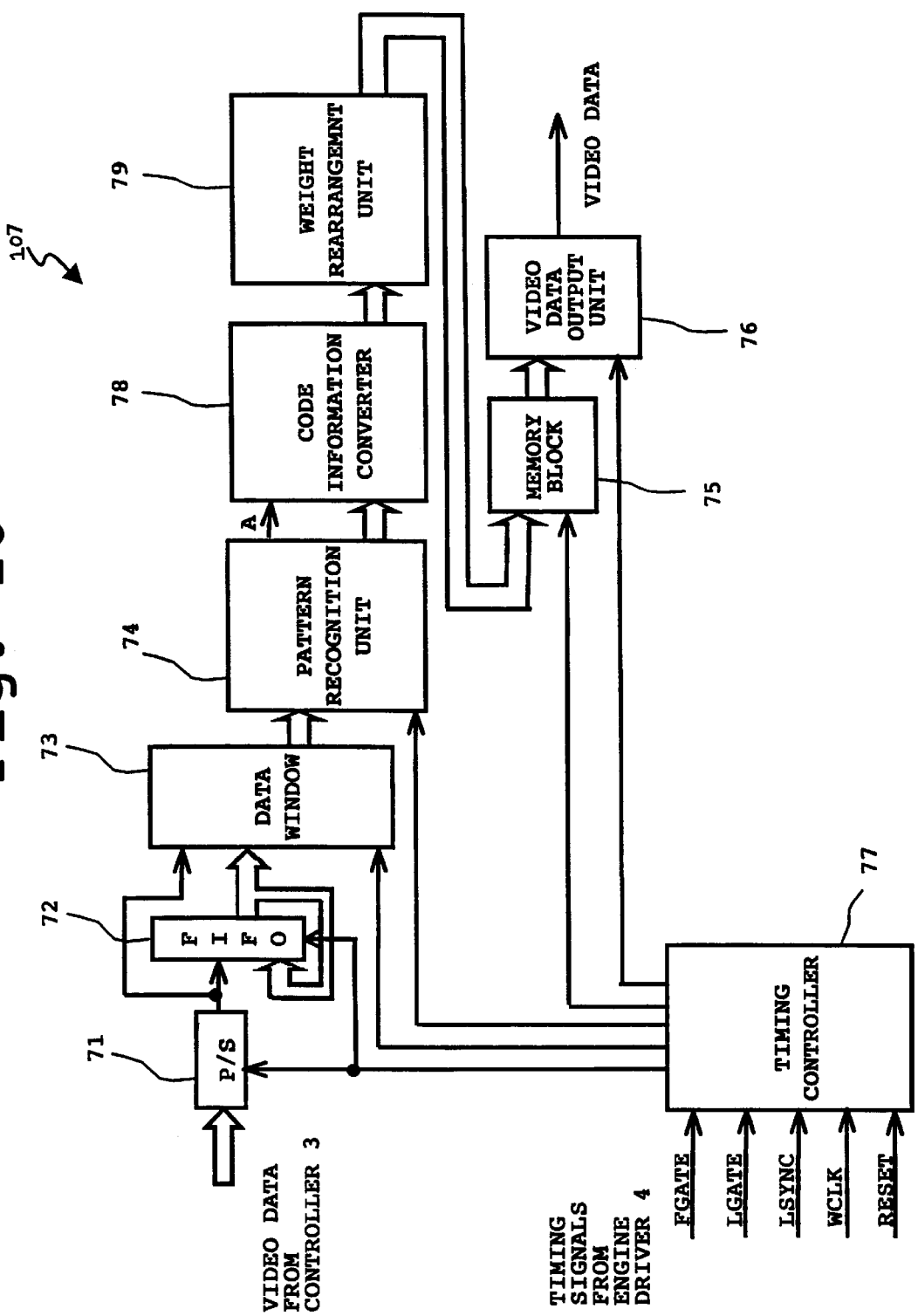
FIG. 10 is a block diagram of a first modified dot correction unit of the laser printer of FIG. 1.

Next, a first modification for the dot correction unit 7 is explained with reference to FIGS. 10 and 11. A first modified dot correction unit 107 of FIG. 10 is configured in a similar manner to the basic dot correction unit 7 of FIG. 4, except for an addition of a weight rearrangement unit 79. In the following description of the dot correction unit 107, elements which correspond to those of the basic dot correction unit 7 described with reference to FIG. 4 are provided with the same reference numerals, and the description for these elements are not repeated for the sake of conciseness.

The weight rearrangement unit 79 receives the above-described 12-bit code information from the code information converter 78 and converts the data into a packet of serial-ordered values, as illustrated in Table 3 of FIG. 11. The reason for this operation is that the size of the memory block 75 is reduced by the code information converter 78 but an efficiency of the memory addressing, with respect to the reduced number of addresses (3072 addresses), for reading and writing data with 12-bit code information (4096 codes) has not been improved.

The above-mentioned 3074 codes randomly selected from 4096 codes may not have serial values but discrete values. The weight rearrangement unit 79 converts such 3074 non-serial codes into 3074 serial codes, so that the 3074-address data corresponds to 3074 memory locations in the memory block 75 in a serial order. Accordingly, the memory block 75 can be efficiently accessed with serial-ordered addressing for a reading or downloading operation.

Figure 12:
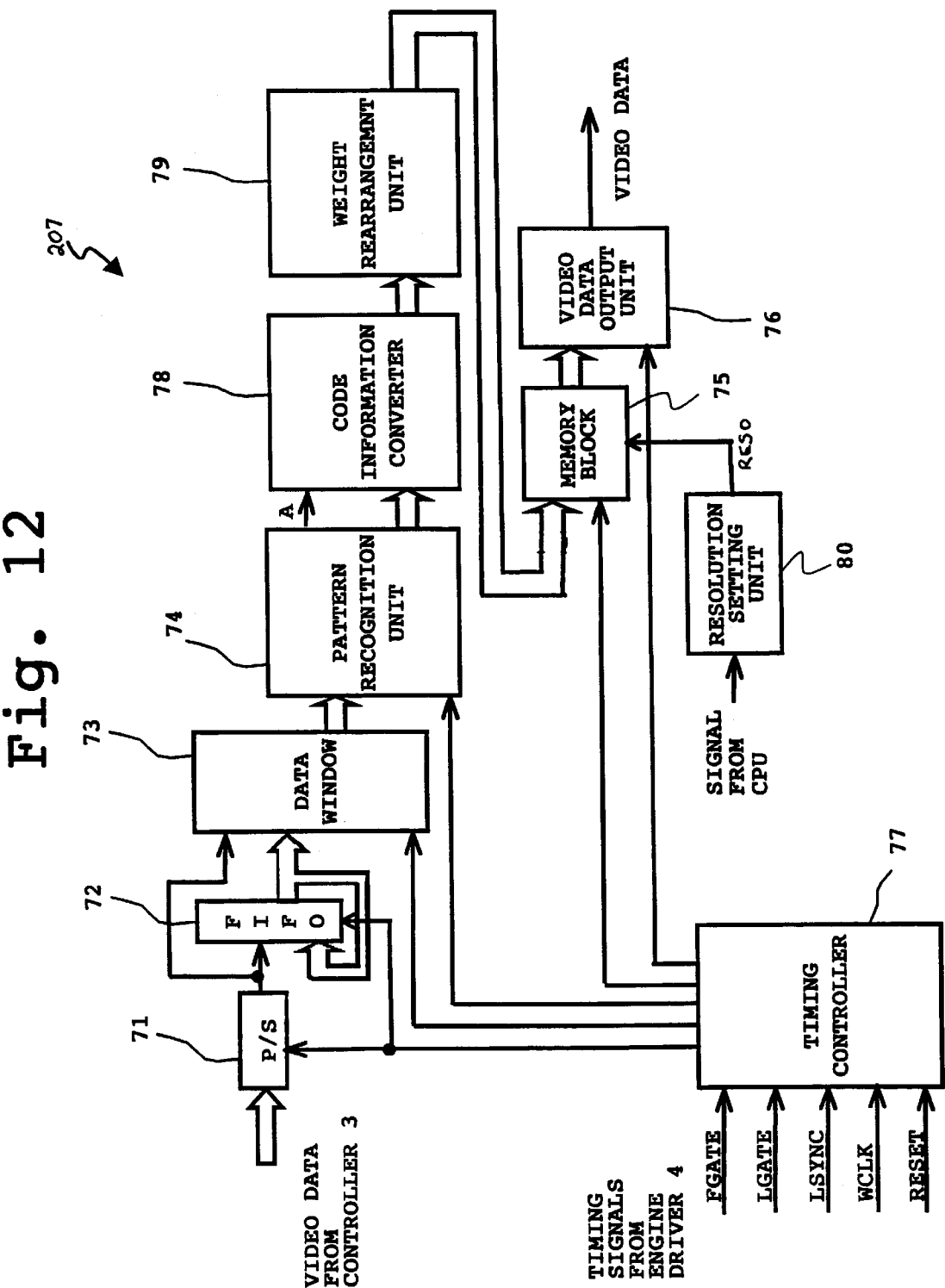
FIG. 12 is a block diagram of a second modified dot correction unit of the laser printer of FIG. 1.

Next, a second modification for the dot correction unit 7 is explained with reference to FIGS. 12 and 13. A second modified dot correction unit 207 of FIG. 12 is configured in a similar manner to the dot correction unit 107 of FIG. 10, except for an addition of a resolution setting unit 80. In the following description of the second dot correction unit 207, elements which correspond to those of the dot correction unit 107 described with reference to FIG. 10 are provided with the same reference numerals, and the description for these elements are not repeated for the sake of conciseness.

The resolution setting unit 80 determines a resolution of the bit-mapped image data to be processed through the dot correction operation by the dot correction unit 7. The resolution setting unit 80 outputs the resolution information as additional address data to the memory block 75. The output signal is referred to as a RES0 (resolution) signal. Although the example being explained has one output (RES0) which provides two possible resolutions, it may also be possible to have more resolutions. For example, RES0 and RES1 signals will make it possible to have 4 resolutions. By the RES0 signal, an area of the corrected dot pattern data in the memory block 75 can be switched, as illustrated in Table 4 of FIG. 13. For example, when the resolution is set to a value A and the resolution setting unit 80 sets the RES0 signal to 0 (low), corrected dot pattern data is selectable in the lower memory area of the memory block 75. When the resolution is set to a value B and the resolution setting unit 80 sets the RES0 signal to 1 (high), corrected dot pattern data is selectable in the upper memory area of the memory block 75.

In addition, the dot correction units 7, 107, 207 may be arranged in the controller 3 or in the engine driver 4.

Further, the above-described dot correction units 7, 107, 207 may be applied not only to the laser printer of LD unit 50 but also to various other image forming apparatuses that use a bit-mapped image, including electrophotographic printers such as a LED (light-emitting diode) printer, digital copying machines, plain paper facsimile machine, and to various image display apparatus that handle bit-mapped image, etc.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations of the present invention are possible in light of the above teachings. It is therefore to be understood that within the scope of the appended claims, the present invention may be practiced otherwise than as specifically described herein.

This application is based on Japanese patent application No. JPAP09-237806 filed in the Japanese Patent Office on Aug. 18, 1997, the entire contents of which are hereby incorporated by reference.

What is claimed as new and is desired to be secured by Letters Patent of the United States is:

1. An image data processing apparatus, comprising:
   a data window which successively captures dot patterns, each dot pattern having a dot of interest and surrounding dots, to read data of bit-mapped image data;
   a pattern recognition mechanism recognizing a figure of a line segment formed between black and white dot areas included in each of said captured dot patterns, based on said read data from each of said dot patterns, the pattern recognition mechanism generating a n-bit code that has a value corresponding to said recognized figure of the line segment, where n is an integer, the n-bit code having up to $2^n$ different values each representing a specific figure of the line segment;
   a determining mechanism determining whether said dot of interest needs a correction based on the value of said n-bit code;
   an information converter converting a plurality of values of said n-bit code to one of two predetermined values which indicate whether said dot of interest is white or black when said dot of interest needs no correction, and then outputting said n-bit code having one of said two predetermined values, and outputting said n-bit code without conversion when said dot of interest needs said correction;
   a memory block storing a number of correction data, and including correction data for cases when said dot of interest needs correction and for two substituting cases when said dot of interest needs no correction, each of said correct data uniquely corresponding to one of said $2^n$ different values, and then outputting one of said plurality of correction data when accessed with said corresponding n-bit code.

2. The image data processing apparatus according to claim 1, further comprising a weight rearrangement unit which converts a plurality of said n-bit codes having said discrete values into n-bit codes having serial-ordered values, and which outputs said converted n-bit codes to said memory block.

3. The image data processing apparatus according to claim 1, further comprising a memory select unit that selects a memory area to be used from among a plurality of memory areas included in said memory block.

4. The image data processing apparatus according to claim 3, wherein each of said plurality of memory areas included in said memory block stores said plurality of correction data, having an image resolution different from other memory areas, and said memory select unit is used for selecting said resolution.

5. An image data processing apparatus, comprising:
   data window means for successively capturing dot patterns, each dot pattern having a dot of interest and surrounding dots, to read data of bit-mapped image data;
   pattern recognition means for recognizing a figure of a line segment formed between black and white dot areas included in each of said captured dot patterns, based on said read data from each of said dot patterns, and for generating a n-bit code that has a value corresponding to said recognized figure of the line segment, where n is an integer, the n-bit code having up to $2^n$ different values each representing a specific figure of the line segment;

determining means for determining whether said dot of interest needs a correction based on the value of said n-bit code;

information converting means for converting a plurality of values of said n-bit code to one of two predetermined values which indicate whether said dot of interest is white or black when said dot of interest needs no correction, and for then outputting said n-bit code having one of said two predetermined values, and for outputting said n-bit code without conversion when said dot of interest needs said correction;

memory block means for storing a number of correct data, and including correction data for cases when said dot of interest needs correction and for two substituting cases when said dot of interest needs no correction, each of said correction data uniquely corresponding to one of said $2^n$ different values, and for then outputting one of said plurality of correction data when accessed with said corresponding n-bit code.

6. The image data processing apparatus according to claim 5, further comprising weight rearrangement means for converting a plurality of said n-bit codes having said discrete values into n-bit codes having serial-ordered values and for outputting said converted n-bit codes to said memory block means.

7. The image data processing apparatus according to claim 5, further comprising memory select means for selecting a memory area to be used from among a plurality of memory areas included in said memory block means.

8. The image data processing apparatus according to claim 7, wherein each of said plurality of memory areas included in said memory block means stores said plurality of correction data, having an image resolution different from other memory areas, and said memory select means is used for selecting said resolution.

9. A method of conserving a memory in use of operations for correcting dots of bit-mapped image data in an image data processing apparatus, said method comprising the steps of:

successively capturing dot patterns, each dot pattern having a dot of interest and surrounding dots, to read data of bit-mapped image data;

recognizing a figure of a line segment formed between black and white dot areas included in each of said captured dot patterns, based on said read data from each of said dot patterns;

generating a n-bit code that has a value corresponding to said recognized figure of the line segment, where n is an integer, the n-bit code having up to $2^n$ different values each representing a specific figure of the line segment;

determining whether said dot of interest needs a correction based on the value of said n-bit code;

converting a plurality of values of said n-bit code to one of two predetermined values which indicate whether said dot of interest is white or black, when said dot of interest needs no correction;

outputting said n-bit code having one of said two predetermined values;

outputting said n-bit code without conversion when said dot of interest needs said correction;

storing a number of correction data, including correction data for cases when said dot of interest needs correction and for two substituting cases when said dot of interest needs no correction, each of said correction data uniquely corresponding to one of said $2^n$ different values; and outputting one of said plurality of correction data when being accessed with said corresponding n-bit code.

10. The method according to claim 9, further comprising the steps of converting a plurality of said n-bit codes having said discrete values into n-bit codes having serial-ordered values, and sending said converted n-bit codes to be used as addresses in said step of outputting one of said plurality of correct data.

11. The method according to claim 9, further comprising the step of selecting a memory area to be used from among a plurality of memory areas in which said number of correct data are stored in said storing step.

12. The method according to claim 11, wherein each of said plurality of memory areas storing said plurality of correction data has an image resolution different from other memory areas, and said selecting step is used for selecting said resolution.

* * * * *

UNITED STATES PATENT AND TRADEMARK OFFICE
CERTIFICATE OF CORRECTION

PATENT NO. : 6,262,813 B1
DATED : July 17, 2001
INVENTOR(S) : Ohshita

It is certified that error appears in the above-identified patent and that said Letters Patent is hereby corrected as shown below:

<u>Title page,</u>
Item [12], should read -- **United States Patent
Ohshita** --
Item [75], Inventor, should read -- Masakazu Ohshita, Kawasaki-shi (JP) --

Signed and Sealed this

Nineteenth Day of March, 2002

Attest:

JAMES E. ROGAN
*Director of the United States Patent and Trademark Office*

*Attesting Officer*